Jan. 26, 1954   J. B. PARSONS   2,667,380
COMBINED REGULATOR SYSTEM FOR SELECTIVE OPERATION
OF VEHICLE TOPS, WINDOWS, AND OTHER PARTS
Filed Aug. 10, 1950   2 Sheets-Sheet 1

INVENTOR.
John B. Parsons
BY
ATTORNEY

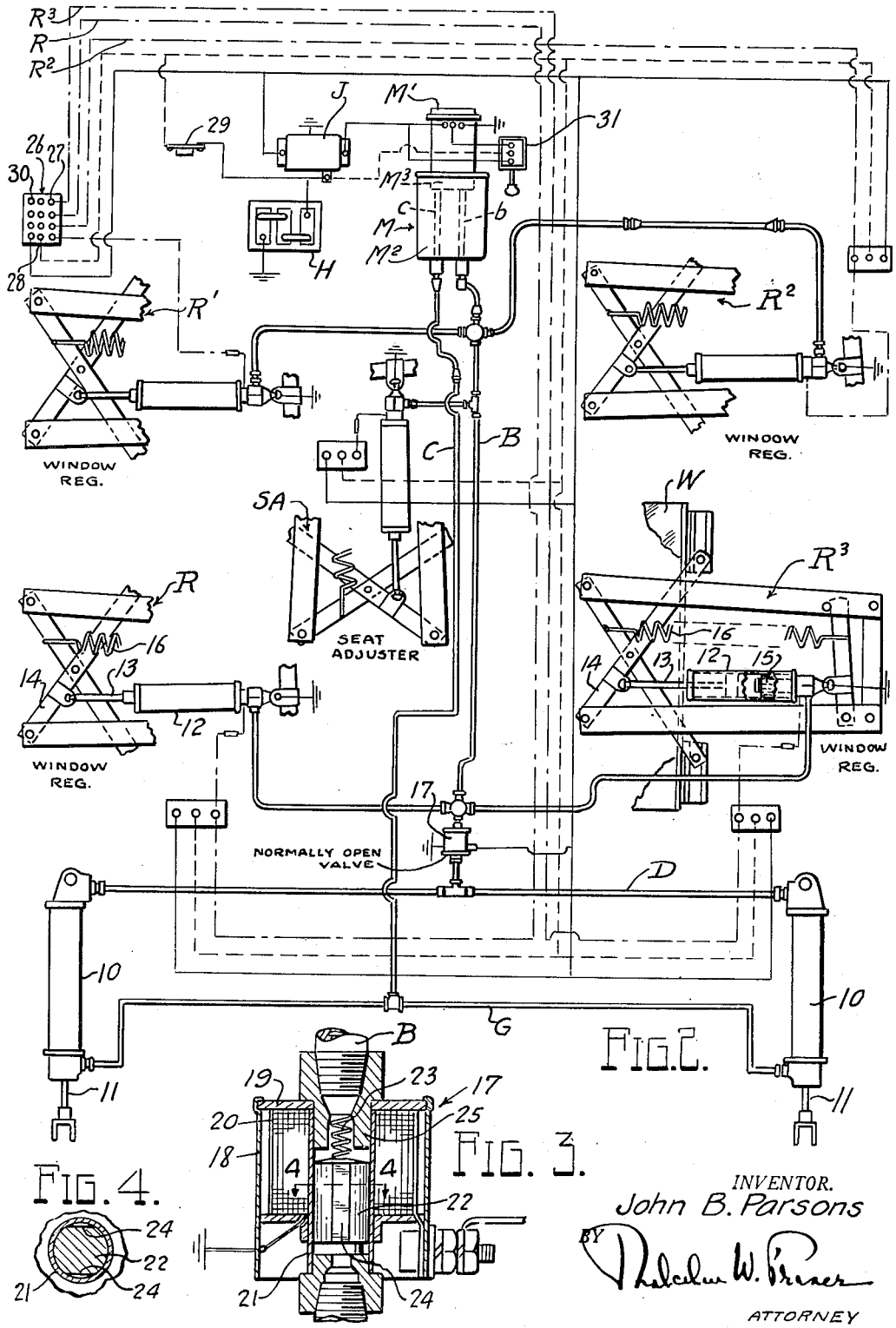

Patented Jan. 26, 1954

2,667,380

UNITED STATES PATENT OFFICE 2,667,380

COMBINED REGULATOR SYSTEM FOR SELECTIVE OPERATION OF VEHICLE TOPS, WINDOWS, AND OTHER PARTS

John B. Parsons, Maumee, Ohio

Application August 10, 1950, Serial No. 178,651

5 Claims. (Cl. 296—117)

This invention relates to regulator mechanism for vehicles, but particularly to regulator mechanism for operating the tops of convertible automobiles and for actuating shiftable members such as windows, seats and the like.

An object is to produce a simple and efficient hydraulic regulator system by which a single reversible electric motor may be employed for the selective operation of various parts of an automobile such as the folding top of a convertible, the opening and closing of windows, the adjusting of seats and for other members which are shifted, actuated or swung between two limits of movement or adjustment.

Another object is to produce a hydraulic regulator for the actuation of vehicle members or parts which employs a single reversible motor which when operated in one direction can be used for the selective actuation or operation of shiftable members such as windows and seats, and in which the reversible operation of the motor may be employed for the actuation of another member such, for example, as the folding top of a convertible automobile between closed and open positions.

Other objects and advantages of the invention will hereinafter appear, and for purposes of illustration but not of limitation, an embodiment of the invention is shown on the accompanying drawings, in which Figure 1 is a side elevation of a convertible automobile, parts being broken away for purposes of clarity to illustrate the hydraulic piston and cylinder assembly for top operation and the hydraulic regulator unit for window actuation;

Figure 2 is a diagrammatic view of the hydraulic regulator system for top operation as well as for window and seat operation;

Figure 3 is an enlarged longitudinal sectional view of the solenoid controlled valve associated with the top operating mechanism; and Figure 4 is a transverse sectional view on the line 4—4 of Figure 3.

Figure 1:
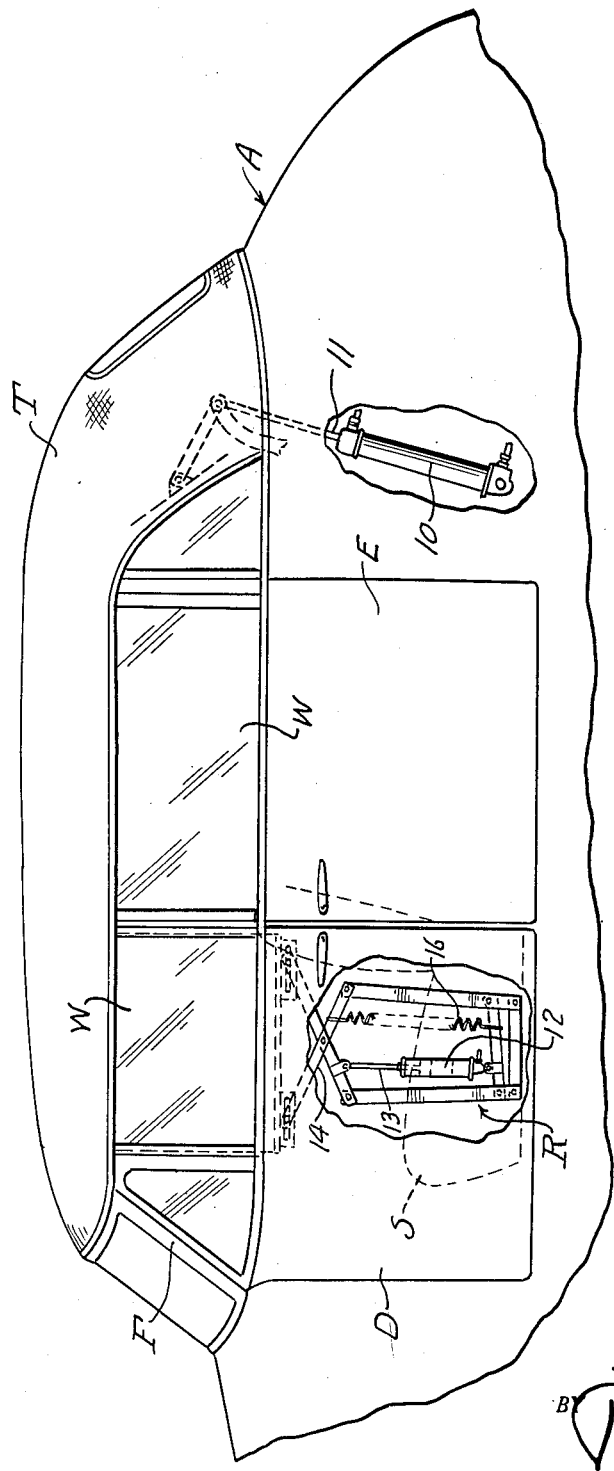

The illustrated embodiment of the invention comprises a convertible automobile A equipped with the usual folding top T which may be carried by the usual frame and linkage ordinarily associated with tops of this character, the same being movable from the raised position shown in Figure 1, to a folded or closed position, as will be readily understood. As shown, the automobile has front doors D and rear doors E, each having windows W which can be slid upwardly to closed position or lowered into the usual well provided in the door frame.

For raising and lowering the top T, a pair of cylinders 10, only one of which is shown in Figure 1, are arranged at opposite sides of the vehicle on the inside and reciprocable within each cylinder 10 is a piston having a piston rod 11 which is connected by a simple yoke to the usual top supporting linkage, the arrangement being such that when the piston rods 11 are forced outwardly from their cylinders 10, the top T is moved from its open or folded position to its raised or unfolded position. In the raised position, the top T is suitably latched to the top of the front windshield frame F. The raising and lowering operation is carried out hydraulically by admitting liquid under pressure to one end or the other of the cylinders 10 as will hereinafter be described.

The windows W are also hydraulically controlled, each window having a regulator unit R disposed in its well and includes a cylinder 12 mounted within a suitable frame in which a piston having a piston rod 13 connects to a cross arm regulator 14 consisting of a pair of links pivoted intermediate their ends and having their lower ends connected to the regulator frame and the upper ends connected to a horizontal guideway secured to the lower edge of the window frame. In the lower end of each cylinder 12 is a solenoid controlled valve 15 which is normally closed, but unseated when the solenoid is energized to admit liquid under pressure to the cylinder or to allow liquid to be forced from the cylinder when the piston moves downwardly. A helically coiled spring 16 connects the other arm of the cross arm regulator 14 to the regulator frame. The arrangement is such that the window W is raised by energizing the solenoid to open the valve of the unit 15 thereby to admit liquid under pressure to raise the piston rod 13. When it is desired to lower the window, the solenoid controlled valve 15 is opened to allow the spring 16 to lower the window. At such time, the pump is not operating to force liquid under pressure to the cylinder. Reference is hereby made to my Patent No. 2,400,572, dated May 21, 1946, wherein the window regulator unit is more fully shown and described.

The front seat S of the automobile A is conveniently mounted for limited adjusting movement forwardly and rearwardly so that the seat can be adjusted to the requirements of the particular driver. Thus as shown on Figure 2, a seat adjusting mechanism is shown which, in general, is similar in construction and operation to the window regulator mechanism above described.

One satisfactory form of seat adjusting mechanism is shown in my application Serial No. 636,717, filed December 22, 1945, now Patent 2,568,930.

Referring to Figure 2, the regulator system is schematically illustrated. Here are shown four window regulator mechanisms R, R', R², and R³ which operate the four windows respectively of the vehicle. A seat adjuster identified as SA is likewise illustrated. This figure also shows the two top operating cylinders 10 with their piston rods 11. M shows a motor pump reservoir unit which includes a reversible electric motor M', a reservoir M² which contains a pump unit M³ which is driven by the electric motor M'. From the pump leads two tubes b and c which serve as pressure and return lines for the pump depending upon the direction of rotation of the electric motor M'. The detail construction and operation of the motor and pump assembly forms no part of the present invention and detail description thereof is not deemed necessary. Suffice it to say that the pump may be a gear pump of the usual type enabling introduction of liquid on one side, the other side being the pressure or outlet side. The reservoir M² which may contain a quantity of liquid is in communication with the pump so that liquid may be returned to and drawn from the reservoir as necessary. Reference is made to my co-pending application Serial No. 173,526, filed July 13, 1950, and entitled "Motor and Pump Assembly," now Patent 2,622,529.

A feature of this hydraulic system resides in the use of a single pump unit driven by a reversible motor, such unit serving to operate selectively not only the individual window regulators W and seat adjuster SA, but also the top operating cylinder and piston assembly 10, 11. Ordinarily when the motor pump unit is operated for window or seat actuation, the electric motor is energized to rotate in one direction but in order to operate the top, the motor is driven in one direction for one top movement and in the opposite direction for the other top movement. In this connection, it will be observed that extending from the tubes b and c are tubes B and C which connect respectively to branch tubes D leading to both of the top cylinders 10. The tube C connects to branch tubing G which leads to the upper ends of both of the cylinders 10. When the motor M is driven in one direction, liquid is forced through the tubing B and D to force the piston rods 11 out of the cylinders 10, thereby to raise the top T. The liquid above the pistons is forced back to the reservoir M² through the tubes G and C. Manifestly when the pump is driven in the opposite direction, the piston rods 11 are forced inwardly of their cylinders 10, thereby to lower the top, liquid being introduced through the tubing C and G and returned to the reservoir through the tubing D and B.

Disposed in the tubing B is a solenoid controlled valve 17 which is normally open. As shown in Figure 3, this valve consists of a casing 18 closed at opposite ends by discs 19 and between the discs is a winding 20 surrounding an inner sleeve 21. Within the sleeve 21 is a cylindrical valve 22 which is urged by a helical coil spring 23 to its open position. The valve 22 has a sliding fit with the annular sleeve 21 but has flats 24 on opposite sides to allow liquid to pass from one end of the valve unit to the other. When the solenoid 20 is energized, the valve 22 moves upwardly against a fitting 25 which provides a seat for the valve thereby preventing the flow of liquid through the sleeve.

The arrangement is such that when any particular window or seat is to be power operated concomitantly with the starting of the motor, the solenoid controlled valve unit 17 is actuated to shift the valve 22 to closed position. At the same time, the particular solenoid controlled valve associated with the selected regulator is opened to admit liquid under pressure from the pump or to allow the liquid from the regulator cylinder to be forced out and returned to the reservoir by the action of the respective coil spring. Thus for window regulator and seat adjuster operation, the electric motor is driven in one direction, the tubes b and B serving both as the pressure line to admit liquid under pressure to the selected regulator or seat adjuster and also as a return line to enable liquid to be returned to the reservoir.

In this instance, a storage battery H supplies current through a relay J to the reversible motor M'. Although individual switches are provided for each of the regulators R, R', R² and R³ as well as the seat adjuster SA, a master switch indicated at 26 usually provided adjacent the driver's seat, is connected to control each of the window regulators so that the driver can open and close each of the windows from his station. On the switch 26 it will be noted that there are three sets of contact points. The set indicated at 27 leads to each of the solenoid valves for the respective window regulators R, R', R² and R³. The set of contacts indicated at 28 leads through an overload circuit breaker 29 to the source of current or storage battery H, whereas the row of contacts 30 leads to the reversible electric motor M' through the relay J. Switch means must be employed such that all three of the adjacent contacts in the rows 27, 28 and 30 are connected in order to energize the electric motor M' to drive the pump and at the same time energize a selected solenoid 15 in one of the window regulators thereby to raise the respective window. On the other hand, by connecting one of the contacts in the row 30 with an adjacent contact in the row 26, the respective solenoid is energized without energizing the electric motor thereby to enable the spring to lower the window and force the liquid back to the reservoir M². It will be seen that adjacent each of the regulators is an individual switch which manifestly operates in a similar manner. It will also be understood that the row of contacts 30 for energizing the electric motor M' is also connected to energize the solenoid 20 forming a part of the normally open valve unit 17, thereby to close that valve. Consequently, when any of the window regulators are operated to raise a window or to adjust the seat by hydraulic power, the solenoid associated with the valve 17 is energized to close it. Consequently, with the valve 17 closed, the liquid can not pass to the top cylinders 10 and must pass to the selected regulator. A suitable switch for accomplishing these results is shown in my Patent No. 2,344,452, dated March 14, 1944, although it will be understood that any suitable switch may be employed.

For top operation, a switch 31 has leads extending respectively to the source of current and also to the opposite windings of the reversible motor M' so that by actuation of the switch, the motor is driven in one direction or the other as desired, thereby to force liquid to one end or the other of the top cylinders 10 for raising or lowering the top. This is made possible by the fact that the valve unit 17 is normally open and is not closed by actuation of the switch 31 as will be manifest from the wiring diagram.

From the above description, it will be apparent that I have produced an exceedingly simple regulator system employing a single motor driven pump which can be utilized not only for the actuation of windows and other shiftable or swingable parts of automobiles such as seats, deck lids, etc., but also for top operation. Heretofore, separate power plants have been required for the actuation of windows and the like and another one for top operation. According to this invention, the cost of installation and the equipment is substantially reduced.

It is to be understood that numerous changes in details of construction, arrangement and operation may be effected without departing from the spirit of the invention especially as defined in the appended claims.

What I claim is:

1. Regulator system for actuation of separate groups of parts of an automobile body, said system comprising hydraulically operated regulator mechanism individual to each part of one group, each of said mechanisms including a piston and cylinder assembly and a normally closed solenoid operated valve controlling the liquid flow to and from the cylinder, a piston and cylinder means for the other group, a reversible pump, a reversible motor for said pump, a pair of main tubes from opposite sides of the pump connecting respectively opposite ends of said piston and cylinder means, a normally open solenoid controlled valve controlling the liquid flow between one main tube and the piston and cylinder means, branch tubes from said last main tube arranged between said normally open valve and the pump and communicating respectively with said first regulator mechanisms, means including switches, electrical circuits and a source of electrical energy for concomitantly driving said motor in one direction, closing said normally open valve and opening a valve of a selected regulator mechanism when the switch is in one position, or for closing said normally open valve and opening a valve of a selected regulator mechanism without driving said motor when the switch is in another position, and separate switch means for causing the motor to rotate in one direction or the other to operate the piston and cylinder means in one direction or the other.

2. A hydraulic system for convertible automobiles having a folding top and a plurality of shiftable members, such as windows or seats, said system comprising; a reversible electric motor having first and second input circuits selectively energizable for driving said motor in one direction or the other; a fluid pump driven by said motor and having a first port on one side thereof for delivering fluid under pressure upon° operation of said motor in said one direction; each of said regulator members including a hydraulic regulator motor for shifting said member in one direction in response to pressure fluid input thereto and means for shifting said member in the opposite direction; individual fluid conduit means connecting each of said hydraulic motors and said first port; a normally closed solenoid valve in each of said individual fluid conduit means; individual control circuit means for opening each of said normally closed solenoid valves upon energization thereof; said pump also having a second port on the other side thereof for delivering fluid under pressure upon operation of said electric motor in the other direction; top operating mechanism including a reversible fluid motor having first and second fluid conduits on respectively opposite sides thereof and arranged to raise or lower said top upon input of pressure fluid to said first or second fluid conduits, respectively; fluid connections between said first and second conduits and the first and second pump ports; a normally open solenoid valve in one of the last-named conduits, a further control circuit for said normally open solenoid valve for closing the same upon energization thereof; a source of electricity; a plurality of individual switch means respectively associated with said regulator mechanisms and alternatively actuatable for concomitantly connecting said source of said first input circuit, to said further control circuit, and to the individual control circuit for the solenoid valve in the regulator mechanism with which said individual switch means is associated or for connecting said source to said last-named control circuit whereby to operate the selected one of said member regulating mechanism independently of said top operating mechanism; and other switch means for selectively connecting said source to said input circuits whereby to operate said top operating mechanism independently of said member regulating mechanisms.

3. A hydraulic system for convertible automobiles having a folding top and at least one shiftable member, such as a window or seat, said system comprising; a reversible electric motor having first and second input circuits selectively energizable for driving said motor in one direction and the other; a fluid pump driven by said motor and having a first port on one side thereof for delivering fluid under pressure upon operation of said motor in said one direction; a fluid motor for shifting said member in one direction in response to pressure fluid input thereto and means for shifting said member in the opposite direction; a first fluid connection between said fluid motor and said first port; a normally closed solenoid valve in said first fluid connection; a control circuit for said normally closed solenoid valve for opening the same upon energization thereof; said pump also having a second port on the other side thereof for delivering fluid under pressure upon operation of said electric motor in the other direction; top operating mechanism including a reversible fluid motor having first and second fluid conduits on respectively opposite sides thereof and arranged to raise or lower said top upon input of pressure fluid to said first or second fluid conduits respectively; fluid connections between said first and second conduits and the first and second pump ports; a normally open solenoid valve in one of the last-named conduits; a control circuit for said normally open solenoid valve for closing the same upon energization thereof; a source of electricity; first switch means for concomitantly connecting said source to said first input circuit and both said control circuits whereby to operate said regulator mechanism independently of said top operating mechanism; and second switch means for selectively connecting said source to said input circuits whereby to operate said top operating mechanism independently of said regulating mechanism.

4. A hydraulic system for convertible automobiles having a folding top and a plurality of shiftable members, comprising; a reversible electric motor having first and second input circuits selectively energizable for driving said motor in one direction or the other; a fluid pump driven by said electric motor; a regulator mechanism for each of said members, each of said regulator mechanisms including a hydraulic regulator motor; individual fluid conduit means connecting each of said hydraulic motors and said pump; a normally closed solenoid valve in each of said individual fluid conduit means; individual control circuit means for opening each of said normally closed solenoid valves upon energization thereof; top operating mechanism including an additional hydraulic motor; second fluid conduit means connecting said additional hydraulic motor and said pump; a normally open solenoid valve in said second fluid conduit means; a further control circuit for closing said normally open solenoid valve; a plurality of individual switch means respectively associated with each of said regulator mechanisms and alternately actuatable for concomitantly connecting said source to said first input circuit, to said further control circuit, and to the individual control circuit for the solenoid valve in the regulator mechanism with which said individual switch means is associated or for connecting said source to said last-named control circuit alone, whereby to operate the selected one of said member regulator mechanisms independently of said top operating mechanism; and other switch means for selectively connecting said source to said input circuit whereby to operate said top operating mechanism independently of said member regulating mechanism.

5. A hydraulic system for convertible automobiles having a folding top and at least one shiftable member, comprising; a reversible electric motor having first and second input circuits selectively energizable for driving said motor in one direction or the other; a fluid pump driven by said electric motor; a regulator mechanism for said member and including a first hydraulic motor; first fluid conduit means connecting said first hydraulic motor and said pump; a normally closed solenoid valve in said first fluid conduit means; first control circuit means for opening said normally closed solenoid valve upon energization thereof; top operating mechanism including a second hydraulic motor; second fluid conduit means connecting said second hydraulic motor and said pump; a normally open solenoid valve in said second fluid conduit means; a second control circuit for closing said normally open solenoid valve; a source of electricity; first switch means alternately actuatable for concomitantly connecting said source to said first input circuit and both said control circuits or for connecting said source to said first control circuit whereby to operate said member regulator mechanism independently of said top operating mechanism; and second switch means for selectively connecting said source to said input circuits whereby to operate said top operating mechanism independently of said member regulating mechanism.

JOHN B. PARSONS.

References Cited in the file of this patent
UNITED STATES PATENTS

| Number | Name | Date |
|---|---|---|
| 2,128,849 | Redfern | Aug. 30, 1938 |
| 2,216,518 | Parsons | Oct. 1, 1940 |
| 2,331,603 | Falcon | Oct. 12, 1943 |
| 2,425,391 | Parsons | Aug. 12, 1947 |
| 2,509,623 | Baade | May 30, 1950 |

OTHER REFERENCES

Chilton's Motor Age, January 1952, pp. 84, 85, 172, 174, 176 and 177.